United States Patent [19]

Deparis et al.

[11] Patent Number: 4,630,266
[45] Date of Patent: Dec. 16, 1986

[54] EQUIPMENT FOR MEASURING DIGITAL CHANNELS MULTIPLEXED BY PACKETS IN A SIGNAL PARTICULARLY ANALOG

[75] Inventors: Georges Deparis, Arcueil; Jacques Duverne, Villevaude; Philippe Meillan, Montrouge, all of France

[73] Assignee: The Establissement Public Telediffusion de France, Paris, France

[21] Appl. No.: 567,863
[22] PCT Filed: Mar. 29, 1983
[86] PCT No.: PCT/FR83/00060
§ 371 Date: Dec. 1, 1983
§ 102(e) Date: Dec. 1, 1983
[87] PCT Pub. No.: WO83/03515
PCT Pub. Date: Oct. 13, 1983

[30] Foreign Application Priority Data

Mar. 29, 1982 [FR] France ................ 82 05326

[51] Int. Cl.⁴ .................... H04J 3/00; H04J 6/00; H04B 17/00
[52] U.S. Cl. ............................ 370/94; 371/22
[58] Field of Search ............... 370/60, 94, 16; 371/22

[56] References Cited

U.S. PATENT DOCUMENTS 4,363,123 12/1982 Grover ........................ 371/22
4,413,335 11/1983 Clements et al. ............... 371/22
4,475,192 10/1984 Fernow et al. ................. 370/94

OTHER PUBLICATIONS

Didon: Diffusion de Donnees par Paquet, Etat de la Technique, Radio-Diffusion-Television Magazine, Dec. 1980, Paris by Joseph Blineay, Guy Dublet, Yves Noirel and Jean-Calude Vardo.

Primary Examiner—Douglas W. Olms
Assistant Examiner—Frank M. Scutch, III
Attorney, Agent, or Firm—Lowe, Price, LeBlanc, Becker & Shur

[57] ABSTRACT

An analog or digital signal mixed with packet-mode digital channels can be the video signal from a television station link in which the digital channels transmit magazines. The packets are inserted at least in the active parts of free lines of the field synchronization signal, to the extent of one packet per line. The measuring equipment comprises for a selected digital channel, means (2) for detecting the address of the digital channel in the packets of the signals (SV) and means for counting (3) and displaying (5) parameters such as the number of packets received, the number of received erroneous packets, the number of not received lost packets, the number of received data words and the number of received erroneous data words during a predetermined cyclic period. Several digital channels mixed in analog or digital signals (CT) can be processed by the equipment.

17 Claims, 4 Drawing Figures

Octet

FIG.4

TABLE ON SCREEN 56 OF RECEIVER 52

| ROW | CR | VIDEO | NVOI | NPAQ | NOCT | PPAQ | TEOC | TPPA |
|---|---|---|---|---|---|---|---|---|
| 0 | | | | | | | | |
| 1 | | | | | | | | |
| 2 | | | | | | | | |
| 3 | | | | | | | | |
| 4 | 01 | FR3 | 0001 | ---- | ---- | ---- | ---- | ---- |
| 5 | 02 | A2 | 0004 | | | | | |
| ... | | | | | | | | |
| 23 | 20 | TF1 | 0005 | | | | | |
| 24 | | | | | | | | |

EQUIPMENT FOR MEASURING DIGITAL CHANNELS MULTIPLEXED BY PACKETS IN A SIGNAL PARTICULARLY ANALOG

The present invention relates to an equipment for measuring digital channels multiplexed by packets in an analog or digital signal. Certain constant time intervals in the signal can randomly include packets to the extent of one packet per time interval. Each packet is conventionally made up of a heading including the address of the respective digital channel and a data block composed of words having a predetermined number of bits; the numbers of words in the data blocks differ from one packet to another.

Such a signal, particularly analog, mixed with packet mode digital channels can be the video signal from a television station link in which the digital channels are designed to transmit bulletins relating to various services. The packets are generally inserted at the line period at least in the active portions of free lines in the field synchronizing signal, where said free lines define time intervals having a constant duration.

The transmission of this multiplex signal through the various items of transmission medium between the transmitter connected to the television station link studio and for example the television receiver of a subscriber or a videotransmission relay generates certain abnormalities that can give rise to modifications in the data words or losses of packets which are more of a source for concern. The use of multiplex signals therefore requires an equipment for monitoring that the data packets are indeed received, by comparing at the transmission studio phase for instance, the packets transmitted and those received through the transmission medium. By interpreting these comparisons, it is possible to guide the technicians to certain probably defective devices in the transmission medium.

It is thus an object of the present invention to provide an equipment for measuring digital channels multiplexed by packets in an analog or digital signal with a view to detecting in particular the number of packets received in each digital channel through the transmission medium during a predetermined measurement time.

Accordingly, the measuring equipment is characterized in that it comprises in combination for a respective digital channel, means for detecting the address of the respective digital channel in the packets of the signal such as an analog or digital video signal and means for counting the number of received packets included in the respective digital channel in response to the detected addresses of the respective digital channel over a predetermined time, control means each for assigning address detecting means to one of the digital channels, and means for displaying said number of received packets after said predetermined time.

In accordance with other features of the invention, the measuring equipment can also display for each digital channel selected in the signal after said cyclic predetermined time:

the number of erroneous received packets responsive to detection of a fault in a particular word included in the heading of each packet and comprising a redundancy portion in accordance with a predetermined code;
the number of not received lost packets;
the number of received data words;
the number of received erroneous data words.

Preferably, the displaying means comprises a conventional television receiver fitted with a peritelevision socket and a known alphanumeric message decoder for converting the measurement results into characters displayable on the screen of the television receiver. The displaying means thus make it possible to reduce the cost of the measuring equipment since the equipment does not make use of the specific display means.

Additionally, the measuring equipment can, in shared time, monitor different multiplexed digital channels in several analog or digital signals. These signals can be video signals from various television station links.

Other features and advantages of the present invention will be more clearly apparent from the following description of several embodiments of the invention in reference to the corresponding accompanying drawings in which:

FIG. 1 shows a line in a television signal that includes a data packet;

FIG. 4 is a table of various parameters measured and calculated by the measuring equipment, the table being visualized on the screen of the television receiver included in the equipment.

Figure 2:
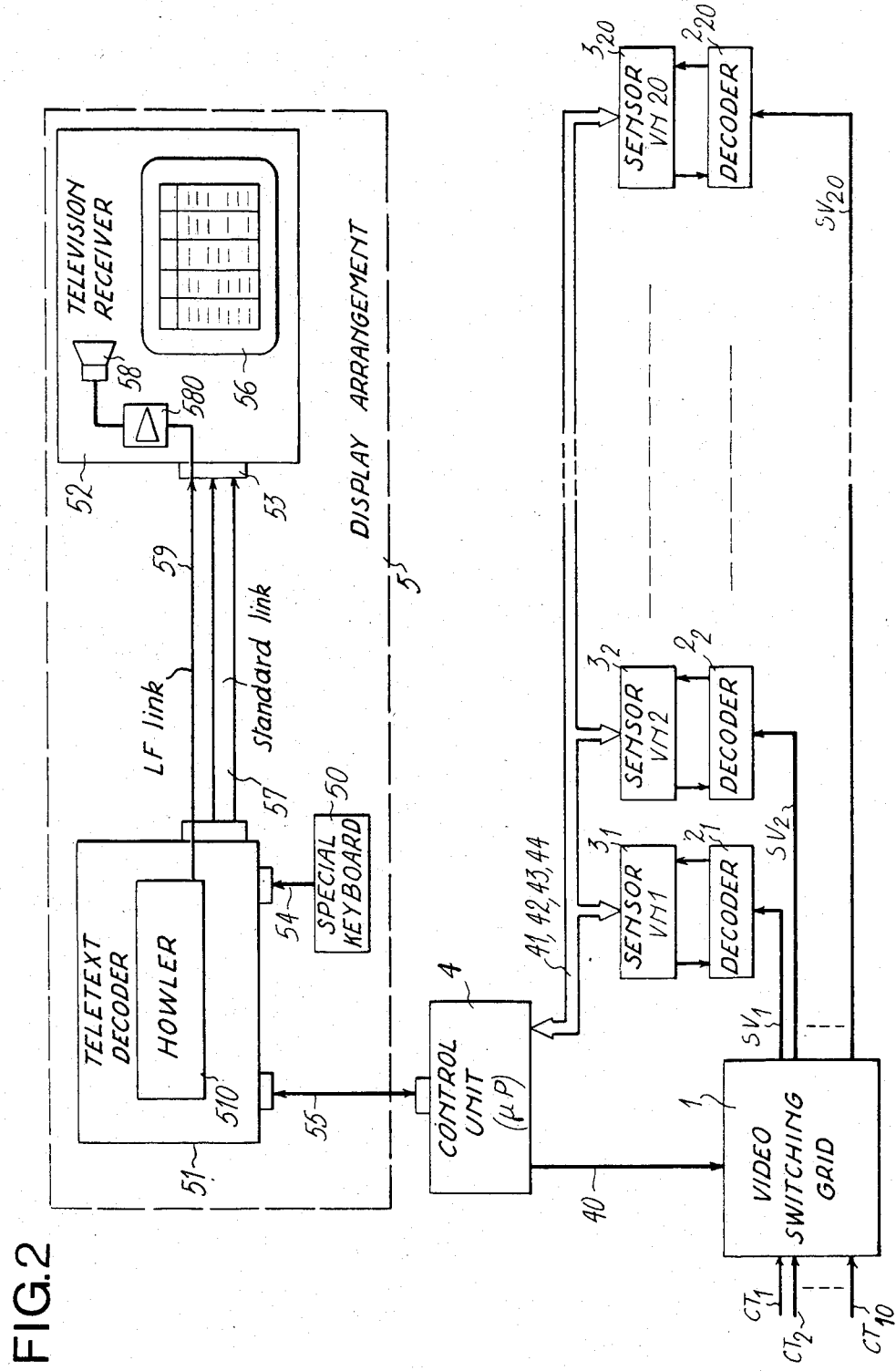
FIG. 2 is a schematic block diagram of the measuring equipment.

To fix ideas, the embodiment of the measuring equipment in accordance with the invention deals with reception of the digital channels carrying data packets and mutiplexed with the picture signal in a television channel as per the standards L. The picture signal is a video signal with 625 lines per picture, a line frequency equal to 15,625 Hz and a field frequency equal to 50 Hz. A line of this video signal is depicted in FIG. 1 and represents a constant time interval having a line period $T_L$ equal to 64 $\mu$s. The start of the line is defined by the point at mid-amplitude on the front of the line synchronizing pulse and this is followed, in the line blanking signal of 12 $\mu$s duration, by the synchronizing pulse of 4.7 $\mu$s duration and the back blanking porch of 5.8 $\mu$s duration. The end of the back porch marks the start front of the active portion of the picture having a 52 $\mu$s duration approximately.

The structure of the data packets and their multiplexing in the picture signal in accordance with this preferred embodiment comply with the standards set forth by the French DIDON system (Data Diffusion ; registered trade-mark). The characteristics of this system as implemented by the present invention are briefly resumed in reference especially to the special edition of the "Radiodiffusion-Television" magazine, December 1980, Paris (FR), by Joseph BLINEAU, Guy DUBLET, Yves NOIREL and Jean-Claude VARDO, entitled "DIDON: DIFFUSION DE DONNEES PAR PAQUET ETAT DE LA TECHNIQUE" and to the technical specifications published by the Public Establishment "TELEDIFFUSION DE FRANCE", Version DZ A4-2, September 1981, Paris (FR), entitled "SYSTEME DE TELETEXTE. Procédés DIDON-ANTIOPE".

In a television channel, the data to be transmitted are provided in the form of octet sequences from each one of various sources. A source can be a data terminal and in particular a teletext terminal such as the encoder of the French ANTIOPE system (registered trade-mark), or system for Digital Acquisition and Televisualization of Written-Page Organized Pictures. At the transmission end, the teletext encoder emits a message or magazine in the form of a sequence of octets in a digital channel at the real rate of 6,203,125 bits/s. In actual fact, each sequence of octets is broken down into data blocks BD. Added to each data block is a heading ET, where each heading/data block assemblage constitutes a packet P, as shown in FIG. 1.

At the transmission end, the encoder in the data distribution system receives various digital channels each carrying data packets and multiplexes them packet by packet by inserting the packets to the extent of one packet per active portion of free line. A free line is one line in which the active portion is not occupied by the picture signal, which is generally the case of the lines of the field synchronizing interval having numbers 6 to 22 in the first field or odd field of the picture and numbers 318 to 335 in the second field or even field of the picture. However, when a telediffusion program is not broadcast, the majority of the other lines can be occupied by packets, thereby corresponding to full channel use. As a result, after the digital channels have been multiplexed, the data distribution system encoder multiplexes the packets with the video signal, i.e. "modulates" the luminance signal of the free lines by the packets. As can be seen in FIG. 1, the first octet $B_1$ of a packet is always inserted at the start of the active portion of a line, 10.5 $\mu$s after the fall front of the line synchronizing pulse. A packet contains 40 octets at the most, which corresponds to whole occupation of the $(40 \times 8)/6203125 \cong 52$ $\mu$s of the active portion of the line.

According to this embodiment, each packet heading comprises 8 octets that in their transmission order are:

first two octets $B_1$ and $B_2$ that consist of a succession of alternate 1s and 0s and form a synchronization burst for reconstituting the clock signal at the bit frequency in the data distribution system decoder at the receiver end;

a third octet O forming an octet synchronization word that is identical for all packets regardless of the digital channel and which permits retrieval of the start of a packet at the receiver end and reconstitution there of the ensuing octets;

three octets $I_1$, $I_2$ and $I_3$ constituting a digital channel identifying word that is the same for all the packets from the same digital channel;

an octet IC constituting a continuity index that is incremented by 1 modulo 16 upon each packet transmitted in the same digital channel and that permits detection at the receiver end of any packet losses in an assemblage of sixteen packets successively transmitted in the same digital channel; and an octet F constituting a packet format indicator that indicates the number of data octets contained in the data block BD of the packet P.

The last five octets $I_1$, $I_2$, $I_3$, IC and F in the heading go together to form the packet "prefix" and each comprise four useful information bits followed by four redundancy bits. The redundancy bits are derived from the information bits via a same Hamming code and thus make it possible at the receiver end to correct single binary errors in the information bits.

With reference now to FIG. 2, it is assumed that the measuring equipment can simultaneously receive ten television channels $CT_1$ to $CT_{10}$ and simultaneously monitor at the most twenty digital channels $VN_1$ to $VN_{20}$. In practice, the ten television channels $CT_1$ to $CT_{10}$ are associated in pairs corresponding to the video channel directly delivered by the television station link control center and to the same video channel after transit via one or more videofrequency relays. In this way, for each television station link, the equipment will be able to monitor information losses or errors between the digital channels in the same video channels respectively transmitted and as received by a subscriber.

The monitoring equipment embodying the invention essentially comprises a video switching grid 1, twenty identical assemblies each formed of a digital channel decoder $2_1$ to $2_{20}$ and a sensor $3_1$ to $3_{20}$ that are designed to monitor respectively twenty selected digital channels $VN_1$ to $VN_{20}$, a control unit 4 and a display arrangement 5 for visualizing the measurement results.

The switching grid 1 receives the ten television channels $CT_1$ to $CT_{10}$. Grid 1 completely restores the analog video signal from one of the television channel along one or more of its twenty output video channels $SV_1$ to $SV_{20}$ every time control unit 4, via an addressing bus 40, selects one or more multiplexed digital channels in said television channel. As will be seen hereinafter, this prior selection is achieved by means of a special keyboard 50 and a decoder 51 peculiar to a particular type of displayable entry character that are included in the display arrangement 5. The operator, thus beforehand, assigns a digital channel for monitor in one of the television channels $CT_1$ to $CT_{10}$ to each assemblage comprised of a digital channel decoder $2_1$ to $2_{20}$ and a sensor $3_1$ to $3_{20}$. The address pairs of assemblies $2_1$ to $2_{20}$ and $3_1$ to $3_{20}$ and corresponding incoming television channels $CT_1$ to $CT_{10}$ are stored in a reprogrammable read-only memory included in the control unit 4 and can be modified by means of the keyboard 50 during measurements, while keeping the possibility of resuming the initial selection at any moment.

The video switching grid 1 can be similar to those described in the article by SURJON C. entitled "Grilles de communication à grande capacité pour centres de télévision", published in the "Radiodiffusion-Télévision" magazine, No. 67, pages 1 to 7, 1981, Paris (FR). The control unit 4 comprises an INTEL 8085 type microprocessor, for example.

One of the assemblages, decoder 2 and sensor 3, will now be described with reference to FIG. 3.

The decoder 2 for a corresponding digital channel VN of an incoming television channel SV selected by grid 1 is a DIDON type decoder that consists of an integrated circuit produced by TEXAS-FRANCE and whose demodulator 20 and demultiplexer 21 are SN93 and TMS 3534 AN circuits respectively. A brief recap on the operation thereof will be given below.

The demodulator 20 of the decoder 2 receives at its video input 200 the corresponding video signal SV in which the data digital channel VN to be processed, among others, is multiplexed. The function of demodulator 20 consists of extracting the data digital channels from the incoming analog video signal VS and of delivering them in series in digital form to the demultiplexer 21, via a lead 201. The demodulator 20 further extracts the line and field composite synchronizing signal that is transmitted to the demultiplexer 21 and sensor 3 via a lead 202. Depending on the composite synchronization signal, the demodulator 20 looks for the two bit synchronizing octets $B_1$ and $B_2$ in each video signal line in order to derive therefrom a validation pulse corresponding to the start of a retrieved packet. Such packet validation pulses are transmitted to the demultiplexer 21 via a lead 203 and have troughs corresponding to the third octet O of each retrieved packet.

The function of the demultiplexer 21 in the decoder 2 consists of extracting from the packets transmitted in lead 201 the packets from the digital channel VN for which the decoder 2/sensor 3 assemblage was specifically selected. In this respect, an addressing bus 210 to the demultiplexer 21, via a bidirectional data bus 41 from the control unit 4 and a programming interface 30 in sensor 3, receives the address of the digital channel VN to be monitored that is stored in a reprogrammable read-only memory of the demultiplexer 21. Whenever the demultiplexer receives a packet validation pulse in the lead 203, the demultiplexer compares the stored address against the address contained in the packet identifying work $I_1$ to $I_3$. If the comparison proves positive, the packet belongs to the digital channel to be monitored. The octets IC, F and the data block BD octets in this packet can be transmitted to the sensor 3 in an 8-lead output bus 211, simultaneously with delivery of a packet detection pulse in an output lead 212 to the sensor 3. The demultiplexer 31 then supplies an octet detection pulse in a lead 213 to the sensor 3 whenever an IC, F and data block BD octet of the packet is transmitted from the demultiplexer output bus 211, until detection of the last octet in the data block BD, as dependent on the format indicating octet F.

The demultiplexer 21 performs other functions and in particular decodes the continuity index octet IC in order to eventually correct the four bits in this octet in accordance with the Hamming code tables that are recorded beforehand by programming in the demultiplexer. The Hamming correcting circuit included in demultiplexer 21 can only correct certain predetermined errors. By way of an example, when the error covers two useful bits, correction is not possible and the corrector indicates this by inserting one bit in state 1 in the last binary element emplacement of least significance in the octet IC. In the opposite case, one bit in state 0 at the same emplacement indicates that the continuity index octet is valid as far as its encoding is concerned. The octet IC together with its error indicating bit is transmitted in the bus 211.

Figure 3:
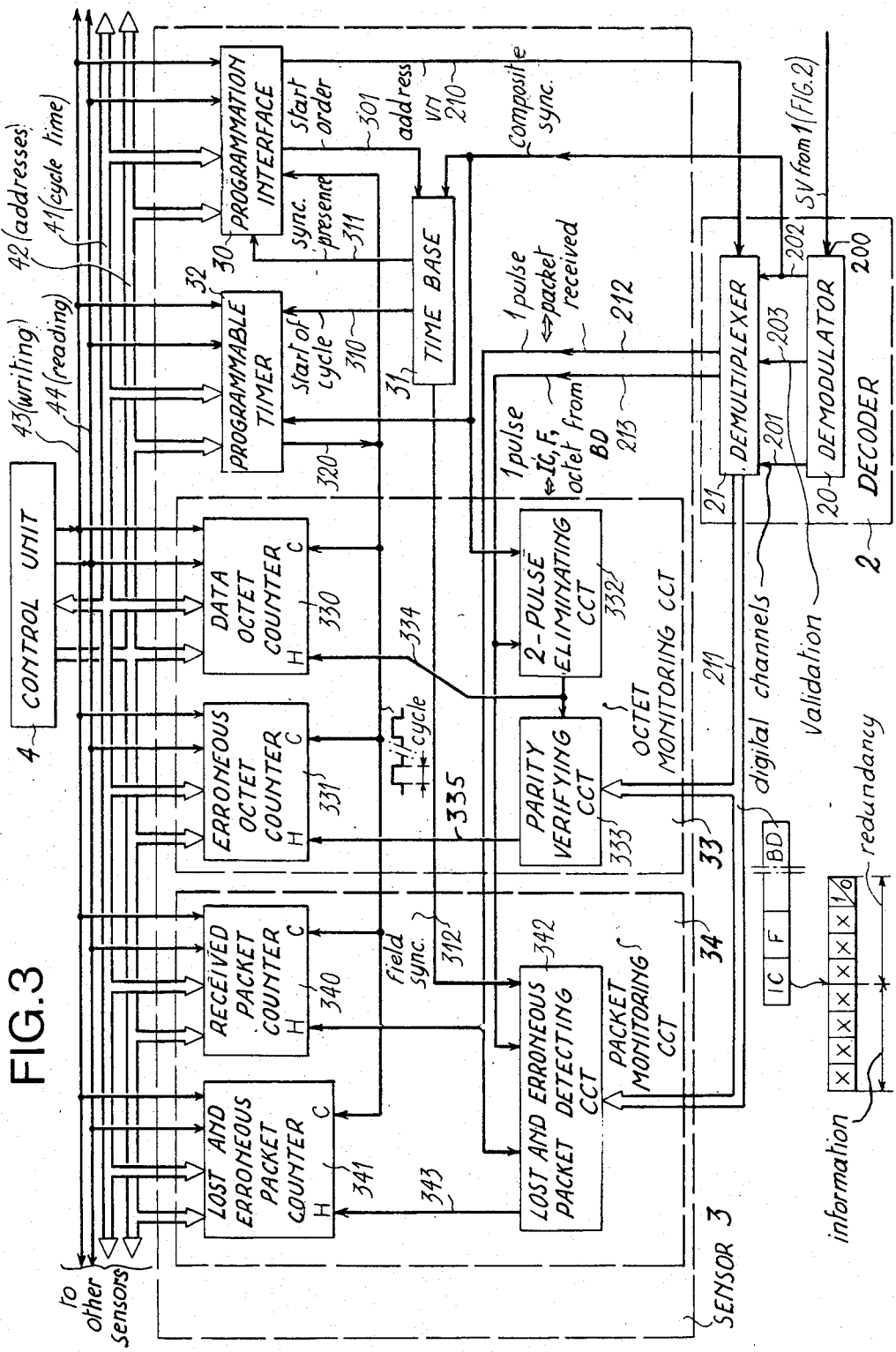
FIG. 3 is a detailed block diagram of a sensor in the measuring equipment relative to a digital channel.

The sensor 3 as depicted in FIG. 3 comprises, besides the programming interface 30, a time base 31 and a programmable timer 32 that deliver all the clock signals required for monitoring the packet found in the digital channel. From lead 202, the time base 31 receives the composite synchronizing pulses as well as from a lead 301 a pulse that indicates the start order for a measurement cycle and that is supplied by the control unit 4 via bus 41 and interface 30. The start of the measurement cycle is determined by the control unit 4 that works in shared time in relation to the information, address and control exchanges with the various selected sensors $3_1$ to $3_{20}$. A cycle is normally set to last one second. The time base 31 synchronizes the cycle start order indicated by the unit 4 in the lead 301 with the start of the field blanking interval which corresponds to line 6 for an odd field and to line 318 for an even field. The start of the measurement cycle corresponds to the start of the field blanking interval that is detected in the composite synchronizing signal in the lead 202 by the time base 31, and the timer 32 is then informed thereof by said time base via a lead 310. The timer 32 receives the composite synchronizing signal in lead 202 such that a word representative of the predetermined measurement cycle is delivered via the bus 41 from the control unit 4 before receiving the cycle start order in the time base 31. A timer output 320 then supplies a cycle pulse having a rise front in synchronism with the cycle start pulse in lead 310 and having a width equal to the cycle time. The cycle pulse is transmitted to the control unit 4 via interface 30 and bus 41 where unit 4 will decide upon start of a new cycle in terms of its availability in relation to the processing operations underway on information from other sensors. The time base 31 further delivers a line synchronization presence signal in a lead 311 to unit 4, via interface 30 and bus 41, that is in a permanent state 1 until such time as a suitable line synchronizing pulse is no longer detected by the time base every 64 $\mu$s. If line synchronization is not detected, the unit 4 will advise that the measurements taken are erroneous.

The chief functions of sensor 3 are satisfied by an octet monitoring circuit 33 and a packet monitoring circuit 34. Each of these circuits 33, 34 comprises two programmable counters, one 330, 340 counting the number of octets or packets detected over the cycle time, and the other 331, 341 counting the number or erroneous octets or lost and erroneous packets over the cycle time.

Prior to the start order, the counters 330, 331, 340 and 341 together with the programming interface 30 are successively addressed by the control unit 4 via an addressing bus 42 peculiar to the considered sensor 3. Via a writing control lead 43, the unit 4 controls zero resetting of the counters and writing of memories inside the timer 32 and the interface 30. The timer 32 then receives a word representative of the predetermined time of the cycle whereas the interface 30 delivers useful informations for programming the demultiplexer, to the demultiplexer 21 of the decoder 2 via bus 210; these informations are transmitted from the unit 4 in bus 41 before the cycle start order. The cycle pulse in output lead 320 from the timer 32 is fed to counting triggering inputs C of the counters 330, 331, 340 and 341 as well as to the interface 30 such that interface 30 can deliver a cycle end signal to the control unit 4 through bus 41. After the end of the measurement cycle, the control unit 4 successively addresses the counters, via addressing bus 42 and a reading control lead 44, such that the counts of the counters are processed in accordance with the unit 4 program and are visualized by the arrangement 5 as will be explained hereinafter.

The octet monitoring circuit 33 further comprises a two-pulse eliminating circuit 332 and a parity verifying circuit 333.

The pulses in the lead 213 that respectively indicate detections of octets IC and F and data block octets, and the composite synchronizing signal in the lead 202 are fed to inputs of the circuit 332. The circuit 332 eliminates the first two pulses indicating the detection of octets IC and F and restores in an output lead 334 only the pulses indicating detection of the data block BD octets of each packet found in the digital channel. The lead 334 is connected to clock input H of the octet counter 330 and to an input of the parity verifying circuit 333. Counter 330 thus counts the number of data octets in the digital channel transmitted over the cycle time.

All the octets in the data block of a packet can carry a predetermined parity imposed upon transmission, or each octet can carry a respective parity that is indicated by the state of a parity bit, where the seven remaining bits in the octet make up the information. The parity verifying circuit 333 is adapted to match the parity mode chosen at the transmission end. Circuit 333 receives the octets IC and F and the data octets from output bus 211 of the demultiplexer 21 and solely verifies for each of the data octets indicted by the pulses in the lead 334 whether or not the octet received has the corresponding parity. When the octet parity differs from that expected, at least one of the octet information bits is erroneous, as indicated by a pulse fed to clock input H of the counter 331 via an output lead 335 from the circuit 333. The counter 331 therefore counts the erroneous data octets in the digital channel during the measurement cycle.

In the packet monitoring circuit 34, clock input H of the counter 340 receives the pulses delivered by the lead 212, and counter 340 therefore counts the packets detected in the digital channel and received over the cycle time.

The packet monitoring circuit 34 further comprises a lost and erroneous packet detecting circuit 342. The octets IC and F and the data block octets of the digital channel packets in the bus 211 as well as the field synchronizing signal that is delivered from output lead 312 of the time base 31, are fed to inputs of the circuit 342. Only the first octet of each packet in the bus 211 which normally corresponds to the continuity index IC, is used in the circuit 342. The presence of the continuity index octet IC in the bus 211 is indicated by the first pulse delivered into the lead 231 further to a pulse delivered from the lead 212 and indicating detection of one packet. For these reasons, the output leads 212 and 213 from the demultiplexer 21 are connected to two other inputs of the circuit 342. For every packet found by the demultiplexer 21, i.e. for each pulse transmitted over the lead 212, the circuit 342 memorizes the octet IC for this packet and detects the least significant bit of the octet IC in the bus 211. If this bit is in state 1, the packet transmitted is erroneous. Next, in the event of the least significant bit being in state 0, thereby measuring that the packet has been validated by the demultiplexer 21, the circuit 342 compares the useful bits in the octet IC of the received packet against the memorized octet IC of the previously received packet. Should the continuity index IC for the received packet be greater than the continuity index of the previously received packet increased by unity modulo 16, then the difference between these two continuity indices less unity is equal to the number of lost packets in the digital channel between the transmission of the two received packets.

An output lead 343 from the circuit 342 delivers a pulse for every erroneous packet and as many pulses as lost packets to clock input H of the counter 341. During a cycle time, the counter 341 thus counts the erroneous and lost packets in the digital channel.

It will be noted that the predetermined time of the measurement cycle for each sensor can be chosen independently of the cycle times for the other sensors through programming the unit 4 using the keyboard 50. The cycle time can however be automatically modified by the unit 4 when, during the last measurement cycle, one of the counters 330 and 340 has reached its maximum count; this means that it has not been possible to count all the octets or packets received during the cycle. If, for example, the cycle is initially one second long, then the unit 4 delivers a new cycle time equal to an integer multiple of the initial time, i.e. for instance a time of 20 seconds equal to the field period.

With reference again to FIG. 2, the display arrangement 5 further comprises means for visualizing the results obtained in each of the sensors $3_1$ to $3_{20}$. The visualizing means take the form of a television receiver 52 fitted with a peritelevision socket 53. Result display is controlled by the unit 4 through the teletext decoder 51 that decodes write characters in the ANTIOPE language. The keyboard 50 carries 13 keys and delivers instructions in particular for making the number of each sensor correspond with a number of a digital channel included in a video channel, via a 9-lead bus 54 to the decoder 51 and then via a bidirectional standard digital link 55 with a bit rate of 19200 bit/s to the unit 4, where the decoder is transparent in this case to the instructions. For the other transmission direction, when the measurement results are to be displayed on screen 56 of the television receiver 52, the unit 4 transmits these results in a form compatible with the ANTIOPE language to the decoder 51 via the digital link 55 and from there to the receiver 52 via a standard link 57 feeding the peritelevision socket 53.

In this way, the ANTIOPE decoder 51 is used in the interactive mode, i.e. decoder 51 can not only receive information from unit 4 but also transmit instructions to unit 4.

The measurement results are set forth in table form as shown in FIG. 4. The table is inscribed in the center of the screen 56 at the field frequency of a television signal, i.e. 50 times a second. The table horizontally comprises 25 rows each having 40 elementary spaces (or columns) each corresponding to an alphanumeric character. The rows are numbered 0 to 24 from top to bottom. The following abbreviations are entered permanently in row No. 2:

CR=sensor number;
VIDEO=name of the video channel;
NVOI=digital channel number;
NPAQ=number of received packets;
NOCT=number of received octets;
PPAQ=number of packet losses;
TEOC=octet error ratio;
TPPA=packet loss ratio.

In the following rows 4 to 24 and under the above abbreviations for each sensor $3_1$ to $3_{20}$ are entered the sensor number, the two numbers characterizing the digital channel monitored by the sensor and the video channel including the digital channel together with the five measurement parameters NPAQ to TPPA that can vary from one measurement cycle to another. Under normal working conditions, the display consists of white or yellow characters, on a black background, except for the name of the video channel that are respectively in different colours to make them easier to read. The three figures CR, VIDEO and NVOI do not vary, apart from when assigning a new digital channel obtained by means of the keyboard 50. The five parameters NPAQ to TPPA are transmitted from the unit 4 to the decoder 51, that processes the parameters for display thereof on the screen 56, at the end of each measurement cycle of a sensor. The parameters NPAQ, NOCT and PPAQ are the counts in the packet 340, octet 330 and packet loss 341 counters. The parameter TEOC is given by the ratio: erroneous octet counter 331 count/NOCT, and the parameter TPPA is equal to ratio (PPAQ/NPAQ). These two ratios are calculated by the unit 4.

At the end of each measurement cycle relative to a sensor $3_1$ to $3_{20}$, the unit 4 stores the five parameters NPAQ to TTPA and compares them respectively against those previously stored. Should at least one of these parameters be modified, then the entire row corresponding to the sensor is rewritten on the screen 56, or in a preferred embodiment, solely the parameters modified are transmitted via the digital link 55 thereby avoiding traffic congestion in link 55 and standard link 57. For each cycle time, predetermined thresholds that should not be overstepped are compared with the parameters TEOC and TPPA. For instance, for a cycle lasting one second, if TEOC and TPPA are respectively greater than $10^{-4}$ and $10^{-2}$, an alarm signal is generated by the unit 4. The alarm signal is transformed in the decoder 51 on the one hand into a visual alarm signal on the screen and, on the other hand, into an audible alarm signal by means of loudspeaker 58 in the television receiver 52, during a predetermined period. The visual alarm signal is indicated by the parameter flashing and a predetermined change in color. The audible alarm signal is triggered by an audiofrequency signal that is supplied by a low-frequency howler generator 510 included in the decoder 51, via a low-frequency link 59 connected to the audio circuit 580 of the television receiver loudspeaker 58.

Other alarms can also be supplied by the unit 4, for instance in the event of absence of the video signal or the digital channel associated with the sensor. Alarms are also generated when the count in one of the sensor counters 330, 331, 340 and 341 exceeds its maximum count, thereby telling the operator that the following measurement cycle is longer, equal for example to 20 ms. Were no digital channel to have been assigned to a sensor, then there are no alarms and only the sensor number CR remains displayed in the corresponding row, and the other numbers and parameters for this row are on zero.

Other embodiments based on the foregoing description can be easily made by those skilled in the art. Thus, the scope of the invention takes in any measuring equipment for digital channels of a single signal, particularly an analog signal, such as a video signal at the line period, or comprising only one or more of the essential monitor and measurement means included in a sensor, such as the means in relation to counting packets 2 and 340, to counting erroneous and/or lost packets 2, 342 and 341, to counting octets 2, 332 and 330 or to counting erroneous data octets 2, 332, 333 and 331, or in relation to parameters from combinations of the aforementioned results. Additionally, after a few modifications feasible for those skilled in the art, the decoder 2 can be replaced by a decoder that decodes digital channels multiplexed in a digital signal, such as a video digital signal.

What we claim is:

1. Equipment for measuring digital channels (VN) multiplexed by packets in a signal particularly analog (SV), said signal having constant time intervals (T$_L$) each including a packet (P), each packet (P) being made up of a heading (ET) including the address (I) of the respective digital channel (VN) and a data block (BD) composed of words (octets) having a predetermined number of bits, characterized in that it comprises in combination for a respective digital channel (VN), means (2) for detecting the address (I) of the respective digital channel in the packets of the signal (SV) and means (340) for counting the number (NPAQ) of received packets included in the respective digital channel (VN) in response to the detected addresses of the respective digital channel over a predetermined time (cycle time), control means (4, 50) each for assigning address detecting means (2) to one of the digital channels, and means (5) for displaying said number of packets received after said predetermined time, at least one word (IC) in the heading of each packet comprising an information portion and a redundancy portion derived from the information portion using a predetermined code, said equipment being further characterized by comprising in combination with the address detecting means (2) for one respective digital channel (VN), means (21, 342) for decoding the redundancy portion in said word (IC) of the heading for each packet received from the respective digital channel (VN), means (341) for counting the number of erroneous received packets in response to the decoded redundancy portions not corresponding to the information portions of said words (IC) in the headings of received packets from the digital channel throughout said predetermined time, and means (5) for displaying said number of erroneous received packets after said predetermined time.

2. Equipment according to claim 1, characterized in that it comprises means (5) for displaying the whole number of erroneous and lost packets (PPAQ) after said predetermined time.

3. Equipment according to claim 2, characterized in that it comprises means (4) for calculating at least one of the ratio (TTPA) of erroneous packets, lost packets and erroneous and lost packets with respect to the number of received packets (NPAQ) and means (5) for displaying at least the calculated ratio (TTPA) after the predetermined time.

4. Equipment according to claim 1, characterized in that it comprises in combination with the address detecting means (2) for one respective digital channel (VN), means (21, 332) for generating a pulse in response to each word of the date block (BD) in the received packets of the respective digital channel (VN), means (330) for counting the number (NOCT) of received data words in the respective digital channel in response to the pulses detected during the predetermined time, and means (5) for displaying said number of received data words after said predetermined time.

5. Equipment according to claim 4 in which each data word carries a predetermined parity, characterized in that it comprises in combination with the address detecting means (2) and pulse generating means (21, 332) for one respective digital channel (VN), means (333) for verifying the parity of the data words in the packets received from the respective digital channel, means (331) for counting the number of erroneous received data words in response to parities differing from the respective predetermined parities of the data words from the respective digital channel over the predetermined time, and means (5) for displaying said number of erroneous received data words after said predetermined time.

6. Equipment according to claim 5, characterized in that it comprises means (4) for calculating the ratio (TEOC) of erroneous data words with respect to the number of received data words and means (5) for displaying the calculated ratio (TEOC).

7. Equipment according to claim 1, characterized in that the control means (4) addressing in shared time the counting means (330, 331, 340, 341) assigned to respective digital channels for zero-resetting each of said counting means before the predetermined time assigned to the respective digital channel and for reading the counts in the respective counting means after said predetermined time with a view to their display.

8. Equipment according to claim 7, characterized in that the predetermined time assigned to each digital channel is cyclic in terms of the availability of control means (4) to process in particular the counts and addressings in relation to the other assigned digital channels.

9. Equipment according to claim 1, characterized in that the displaying means (5) comprises a television receiver (52) equipped with a peritelevision socket (53), a keyboard (50) for assigning in the control means (4) each of the address detecting means (2) to a digital channel (VN), and intermediate decoding means (51) between the peritelevision socket (53) and an output digital link (55) from the control means (4) for decoding information such as the number of the address detecting means, the address of the digital channel and the counts into characters intended for visualization on the screen (56) of the television receiver.

10. Equipment according to claim 9, characterized in that the informations related to the digital channels are arranged in horizontal rows of a table (FIG. 4) displayed on said screen (56) under the control of the decoding means (51).

11. Equipment according to claim 9, characterized in that the decoding means (51) produces an alarm in response to a measurement parameter to be displayed (count or ratio) greater than a respective predetermined threshold in relation to each digital channel (VN).

12. Equipment according to claim 11, wherein the decoding means (51) transform the alarm visually on the screen by flashing the parameter, color changing or like the parameter.

13. Equipment according to claim 11 characterized in that the decoding means (51, 510) transform the alarm by a howling emitted by the loudspeaker (58) of receiver (52).

14. Equipment according to claim 11, characterized in that, when the maximum count of counting means is reached over a predetermined time assigned to a digital channel, an alarm is generated and the control means (4, 32) assignes a longer predetermined time.

15. Equipment according to claim 1 for measuring digital channels (VN) multiplexed by packets in signals particularly analog (CT), characterized in that it comprises switching means (1) receiving said signals (CT) for selectively assigning each of address detecting means (2) to one of the signal digital channels, the address detecting means assigned to digital channels of one same signal receiving solely said signal (SV) from switching means.

16. Equipment according to claim 9, characterized in that the number (VIDEO) of the signal is also displayed on the screen (56) for each assigned digital channel.

17. Equipment for measuring digital channels (VN) multiplexed by packets in a signal particularly analog (SV), said signal having constant time intervals ($T_L$) each including a packet (P), each packet (P) being made up of a heading (ET) including the address (I) of the respective digital channel (VN) and a data block (BD) composed of words (octets) having a predetermined number of bits, characterized in that it comprises in combination for a respective digital channel (VN), means (2) for detecting the address (I) of the respective digital channel in the packets of the signal (SV) and means (340) for counting the number (NPAQ) of received packets included in the respective digital channel (VN) in response to the detected addresses of the respective digital channel over a predetermined time (cycle time), control means (4, 50) each for assigning address detecting means (2) to one of the digital channels, and means (5) for displaying said number of packets received after said predetermined time, at least one word (IC) in the heading of the packets of each of the digital channels being incremented by unity modulo a predetermined integer number (16) for each digital channel (VN) packet transmitted in the signal (SV), the equipment being characterized by comprising in combination with the address detecting means (2) for one respective digital channel (VN), means (342) for memorizing said word (IC) in the heading of each packet received from the respective digital channel (VN), means (342) for comparing said heading word of the received packet against said memorized heading word (IC) of the previously received packet, means for counting the number of lost packets in response to differences in said words (IC) of two successive received packets from the respective digital channel greater than unity modulo said predetermined number over the predetermined time, and means (5) for displaying said number of lost packets after said predetermined time.

* * * * *